UNITED STATES PATENT OFFICE.

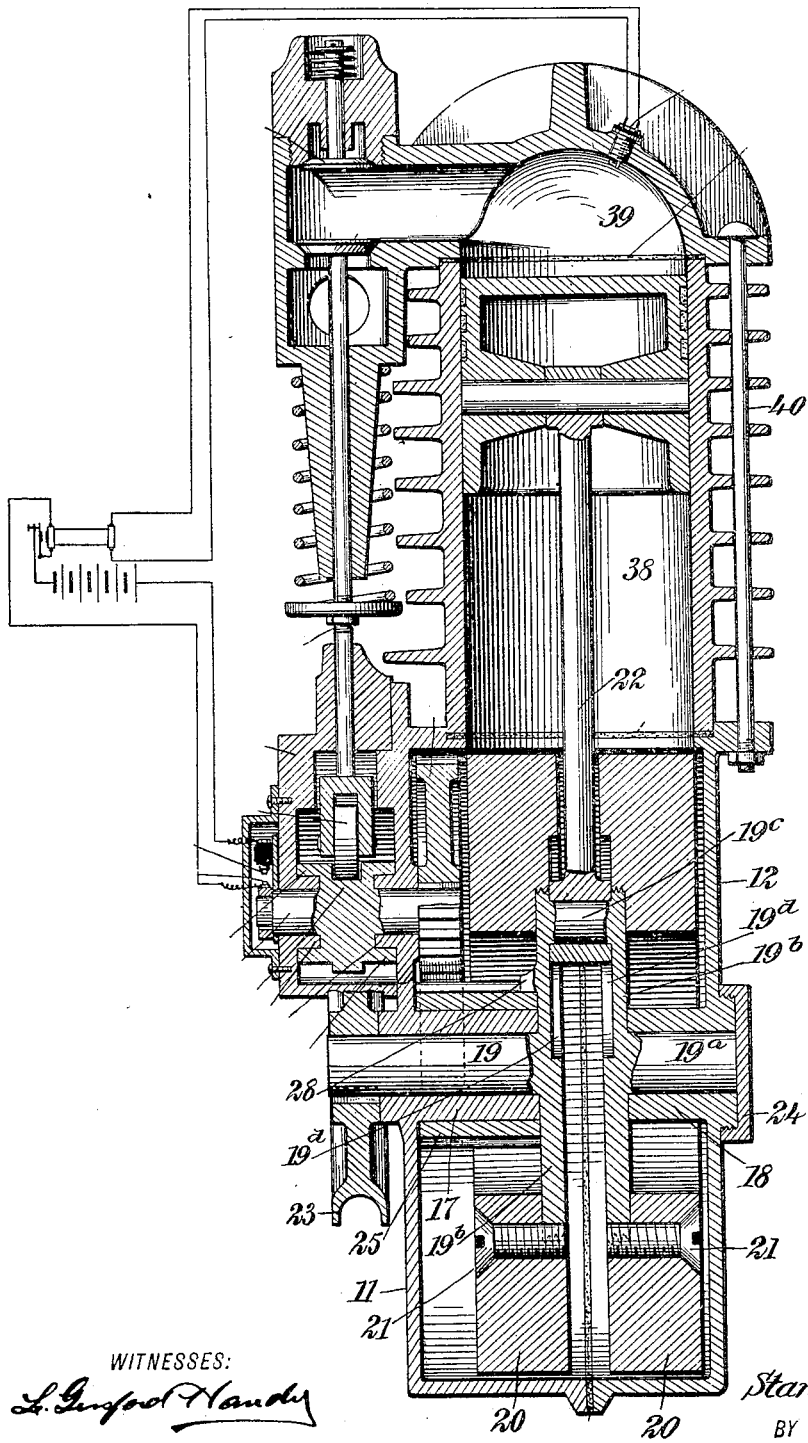

STANLEY W. SHAW, OF GALESBURG, KANSAS.

FLY-WHEEL AND CRANK-SHAFT STRUCTURE.

No. 800,497.  Specification of Letters Patent.  Patented Sept. 26, 1905.

Application filed March 30, 1904. Serial No. 200,668.

*To all whom it may concern:*

Be it known that I, STANLEY W. SHAW, a citizen of the United States, and a resident of Galesburg, in the county of Neosho and State of Kansas, have invented a new and Improved Fly-Wheel and Crank-Shaft Structure, of which the following is a full, clear, and exact description.

This invention relates particularly to improvements in the construction of the crank-case, crank-shaft, and fly-wheel of internal-combustion engines; but it may be used with other machinery if desired.

The underlying object of the invention is to increase the compactness of the engine at the point of the crank-shaft and crank-case and at the same time to provide long bearing-surfaces, thus decreasing the friction and giving the moving parts greater and more secure support.

This specification is an exact description of one example of the invention, while the claims define the actual scope thereof.

Reference is to be had to the accompanying drawing, forming a part of this specification, and representing a vertical or longitudinal section of an internal-combustion engine equipped with my improvements.

The crank-case is preferably formed of two sections 11 and 12, fastened together, as shown. 38 indicates the cylinder, and 39 the cylinder-head, which are fastened to the crank-case by tie-rods 40. The sections 11 and 12 of the crank-case are formed with inwardly-extended boxes 17 and 18, carrying the crank-shaft, which comprises two end sections 19 19$^a$, respectively, carrying disks 19$^b$, said disks being connected by a crank-pin 19$^c$. The parts 19, 19$^a$, 19$^b$, and 19$^c$ are formed integral, and the inner surfaces of the disks 19$^b$ have reduced portions 19$^d$ to permit balancing the weight of the crank-pin. The fly-wheel is located within the crank-case and comprises two annular rim-like sections 20, respectively, screwed on the peripheries of the disks 19$^b$ and locked thereto by screws or pins 21, as shown. The piston-rod 22 is joined to the crank-pin 19$^c$ in any desired manner and works between the fly-wheel sections 20, as shown. The crank-shaft section 19, or the crank-shaft section 19$^a$, if desired, is extended beyond the crank-case and carries an element 23, by means of which the power of the engine may be transmitted. On the end of the crank-shaft opposite the gear member 23 a cap 24 is located, this cap being fastened to the crank-case and inclosing the end of the crank-shaft, so as to effect at this point a dust and oil proof closure. Motion may be taken from the crank-shaft to drive the cam-shaft or other elements by means of a stud 28, attached to one of the disks 19$^b$, and engaging between the teeth of a gear 25, loosely mounted on the bearing 17.

In connection with this construction it will be observed that the crank-shaft is given exceptionally long bearings, which prevent the parts from being sprung by unusual strains and which also allow the shaft to turn easily in its mountings. It will further be observed that by locating the fly-wheel sections 20 within the crank-case and projecting the bearings into the central openings in the fly-wheel sections the width of the engine at this point is materially decreased, an exterior fly-wheel is entirely avoided, and the strain occasioned by the fly-wheel is transmitted evenly and centrally on the crank-shaft and is borne evenly and centrally by the two bearings 17 and 18.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. The combination of alined crank-shaft sections, disks carried at the contiguous ends thereof, the disks being concentric to the shaft-sections, a wrist-pin extending between the disks eccentrically to the crank-shaft sections, said shaft-sections, disks and wrist-pin being integral, and two annular fly-wheel sections fastened respectively to the peripheral portions of the disks and spaced from each other to permit a connecting-rod passing between the fly-wheel sections.

2. The combination of two crank-shaft sections, concentric disks carried at the contiguous ends thereof, a wrist-pin connecting the disks eccentrically of the shaft-sections, said shaft-sections, disks and wrist-pin being formed integral, annular fly-wheel sections threaded on the peripheries of the disks and spaced from each other to permit receiving
5 the connecting-rod between them, and locking-pins engaging the disks and fly-wheel sections to hold the latter in place.

In testimony whereof I have signed my name to this specification in the presence of two subscribing witnesses.

STANLEY W. SHAW.

Witnesses:
    ED GARRISON,
    GEO. C. THOMPSON.